(12) United States Patent
Rossini et al.

(10) Patent No.: US 9,804,482 B2
(45) Date of Patent: Oct. 31, 2017

(54) REAR-PROJECTION DISPLAY DEVICE

(71) Applicants: COMMISSARIAT A L'ENERGIE ATOMIQUE ET AUX ENERGIES ALTERNATIVES, Paris (FR); RENAULT S.A.S., Boulogne-Billancourt (FR)

(72) Inventors: Umberto Rossini, Coublevie (FR); Stéphane Getin, Grenoble (FR); Martin Pertenais, Dax (FR); Frédéric Sermet, Saint Jean de Moirans (FR); Stéphane Regnier, Verrieres le Buisson (FR)

(73) Assignees: COMMISSARIAT A L'ENERGIE ATOMIQUE ET AUX ENERGIES ALTERNATIVES, Paris (FR); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 15/026,710

(22) PCT Filed: Sep. 26, 2014

(86) PCT No.: PCT/FR2014/052436
§ 371 (c)(1),
(2) Date: Apr. 1, 2016

(87) PCT Pub. No.: WO2015/049443
PCT Pub. Date: Apr. 9, 2015

(65) Prior Publication Data
US 2016/0238921 A1    Aug. 18, 2016

(30) Foreign Application Priority Data
Oct. 3, 2013  (FR) .................... 13 59576

(51) Int. Cl.
*G03B 21/10* (2006.01)
*G03B 21/20* (2006.01)
(Continued)

(52) U.S. Cl.
CPC ............... *G03B 21/10* (2013.01); *G02B 5/32* (2013.01); *G03B 21/2013* (2013.01);
(Continued)

(58) Field of Classification Search
CPC .. G03B 21/10; G03B 21/2013; G03B 21/208; G03B 21/203; G03B 21/2066; G03H 2001/0439; G03H 2001/2292
See application file for complete search history.

(56) References Cited

U.S. PATENT DOCUMENTS 4,582,394 A    4/1986  Boyd
5,187,597 A    2/1993  Kato et al.
(Continued)

FOREIGN PATENT DOCUMENTS

WO    9904576 A1    1/1999
WO    03010571 A1   6/2003

OTHER PUBLICATIONS

International Search Report filed in PCT/FR2014/052436; dated Feb. 19, 2015; 3 pgs.

*Primary Examiner* — Sultan Chowdhury
(74) *Attorney, Agent, or Firm* — Moreno IP Law LLC

(57) ABSTRACT

A rear-projection display device comprises a mobile light source supplying a light beam of at least one wavelength, a holographic mirror reflecting only said at least one wavelength, an absorbent screen and a transmissive diffuser, the absorbent screen being placed on the rear face of the holographic mirror, the elements being arranged such that
(Continued)

the beam from the light source is reflected on the holographic mirror in order to sweep the surface of the transmissive diffuser.

11 Claims, 2 Drawing Sheets

(51) Int. Cl.
  *G03B 21/28* (2006.01)
  *G03B 21/62* (2014.01)
  *G03B 33/06* (2006.01)
  *H04N 9/31* (2006.01)
  *G02B 5/32* (2006.01)

(52) U.S. Cl.
  CPC ......... *G03B 21/2033* (2013.01); *G03B 21/28* (2013.01); *G03B 21/62* (2013.01); *G03B 33/06* (2013.01); *H04N 9/3161* (2013.01)

(56) References Cited

U.S. PATENT DOCUMENTS

| | | | | |
|---|---|---|---|---|
| 5,440,428 | A | * | 8/1995 | Hegg ................... B60K 37/02 345/7 |
| 5,993,006 | A | * | 11/1999 | Takeuchi ............... G03B 21/10 353/30 |
| 2006/0158725 | A1 | * | 7/2006 | Yamamoto ........... G03B 21/567 359/449 |
| 2008/0036977 | A1 | * | 2/2008 | Sugita ................... H04N 9/315 353/82 |
| 2010/0085642 | A1 | * | 4/2010 | Drinkwater .......... F21V 33/006 359/567 |
| 2010/0157255 | A1 | * | 6/2010 | Togino ................ G03B 21/147 353/69 |
| 2010/0202725 | A1 | * | 8/2010 | Popovich .............. G02B 27/48 385/10 |
| 2013/0120814 | A1 | * | 5/2013 | Arai ..................... G03H 1/0011 359/11 |
| 2015/0003484 | A1 | * | 1/2015 | Muendel ............... H01S 5/4081 372/50.12 |

* cited by examiner

REAR-PROJECTION DISPLAY DEVICE

The present patent application claims the priority benefit of French patent application FR13/59576 which is herein incorporated by reference.

BACKGROUND

The present disclosure relates to an overhead projection display device. More particularly, the present disclosure relates to such a display device capable of being integrated in a vehicle passenger compartment.

DISCUSSION OF THE RELATED ART

Overhead projection display devices are advantageously compatible with different overhead projection supports, also called screens. They are in particular compatible with overhead projection supports having curved or complex shapes. Such devices are thus particularly capable of providing information in passenger compartments of vehicles, for example, cars. Indeed, overhead projection display devices may for example be integrated in the central console of the passenger compartment of a car, or also above this central console.

However, devices integrated in vehicle passenger compartments are subject to significant constraints: such devices should in particular be relatively compact and sufficiently directional to avoid projections towards reflective elements such as the windshield or the lateral windows. Further, such devices should ensure the generation of an output light flow sufficient to avoid problems of readability when the vehicle is placed under an illumination of high luminosity, for example, from the sun.

To limit readability problems, a cap is generally provided above the display screens in vehicle passenger compartments. However, this solution is not adapted to the integration of a screen in a significant surface area, for example, in the central console of the vehicle.

SUMMARY

An object of an embodiment is to provide an overhead projection display device overcoming all or part of the disadvantages of known devices and operating without requiring an upper cap.

Another object of an embodiment is to provide such a display device compatible with a curved output screen, having a high output light flow, avoiding parasitic projections, and which is compact and has a relatively low cost.

Thus, an embodiment provides a overhead projection display device comprising a mobile light source supplying a light beam of at least one wavelength, a holographic mirror reflecting only this wavelength, an absorbent screen, and a transmissive diffuser, the absorbent screen being placed on the rear surface of the holographic mirror, the elements being arranged so that the beam originating from the light source is reflected on the holographic mirror to sweep the surface of the transmissive diffuser.

According to an embodiment, the light source is a laser source.

According to an embodiment, the device further comprises a planar mirror on the path of the light beam between the source and the holographic mirror.

According to an embodiment, the light source supplies a light beam at a first red wavelength, a second blue wavelength, and a third green wavelength.

According to an embodiment, the light source is assembled to be mobile along two axes.

According to an embodiment, the holographic mirror is formed of a film comprising, across its bulk, Bragg mirrors.

According to an embodiment, the holographic mirror is formed of a film comprising, across its bulk, Fabry Perot-type cavities.

According to an embodiment, the absorbent screen is a black screen.

According to an embodiment, the device further comprises a package having the mobile light source, the holographic mirror, and the absorbent screen integrated therein, an opening being defined in the package, the transmissive diffuser being placed at the level of this opening.

According to an embodiment, the transmissive diffuser has a curved surface.

According to an embodiment, the transmissive diffuser is a holographic diffuser.

Another embodiment provides a vehicle comprising a central console having a overhead projection device of the above-mentioned type integrated therein.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings and, further, as usual in the representation of optical systems, the various drawings are not to scale.

DETAILED DESCRIPTION

Figure 1:
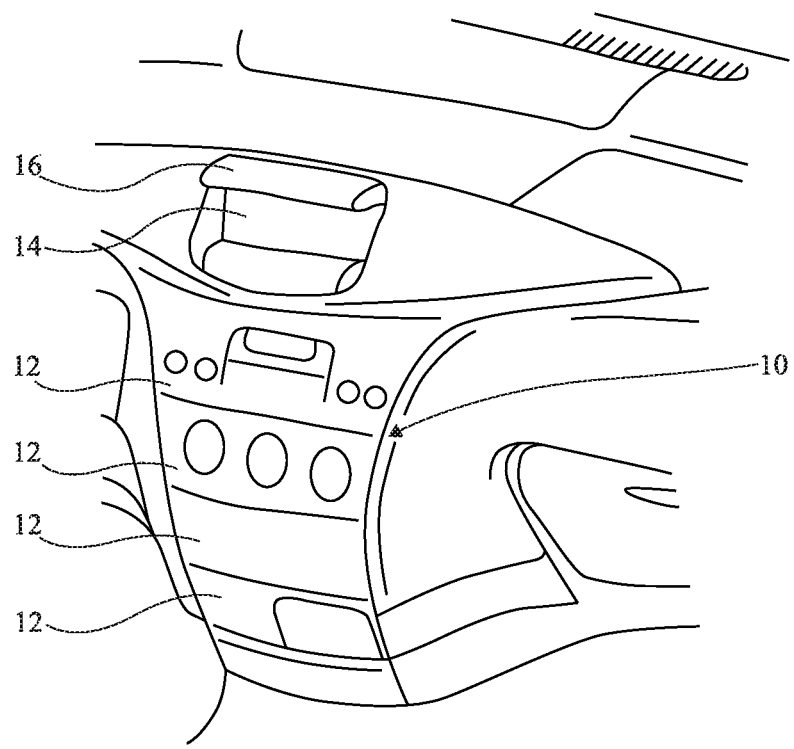
FIG. 1 illustrates a portion of an instrument panel of a vehicle, for example, a car.

FIG. 1 illustrates a portion of the front of the passenger compartment of a vehicle, for example, a car. This drawing shows a central console 10 comprising a plurality of sections 12, each section comprising either information display screens, or buttons. Central console 10 further comprises an upper portion comprising a cavity having a display screen 14 provided at the bottom thereof. The cavity is topped with a cap 16.

The overhead projection display device which is provided herein is particularly adapted to replacing either screen 14 or screens placed at the level of sections 12 of central console 10, or to replacing all the sections of the central console. In the case where the overhead projection system provided herein is used to replace upper screen 14, it should be noted that the presence of cap 16 is not necessary, the device being provided to be sufficiently directional to avoid projecting information towards the windshield or the lateral windows and being further sufficiently luminous to be readable when the screen is reached by parasitic ambient light rays, for example, from the sun.

Further, the overhead projection display device provided herein, if it is used at the level of central console 10, to replace or next to sections 12, may be used to display information for the vehicle driver and/or the passengers. Advantageously, the display device provided herein may have an output screen of curved shape and thus be "seamlessly" integrated in the passenger compartment, and particularly in the central console, that is, in a single block at the front of the central console.

Figure 2:
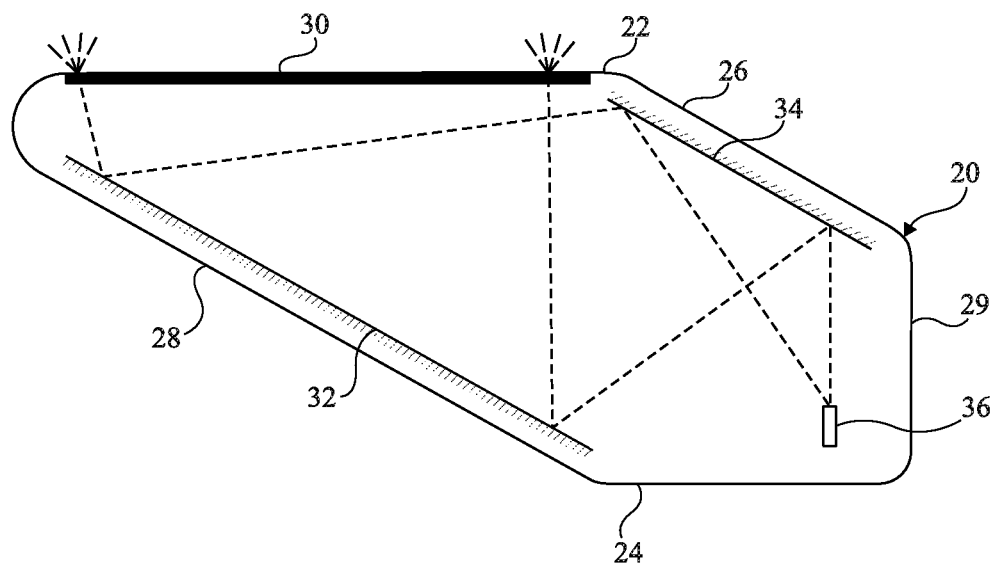
FIG. 2 illustrates a overhead projection display device.

FIG. 2 illustrates a overhead projection display device capable of being used in the passenger compartment of a car, for example, in the central console thereof.

The device comprises a package 20 having projection elements of the overhead projection display device integrated therein. In the shown example, package 20 is defined by two substantially parallel first walls 22 and 24, two second walls substantially parallel to each other 26 and 28, and a third wall 29. Walls 26 and 28 form a non-right angle with walls 22 and 24 and, more specifically, the angle between wall 26 and wall 22 is an obtuse angle and the angle between wall 22 and wall 28 is an acute angle. Wall 29 is perpendicular to walls 22 and 24 and is positioned between walls 24 and 26. Wall 24 is slightly shorter than wall 22 and wall 26 is slightly shorter than wall 28 in the plane of FIG. 2.

Package 20 comprises an outlet opening in wall 22, having a rear projection display screen 30 positioned therein. The rear surface of screen 30, intended to receive an image projected by a light source, faces the inside of the package, while its front surface, intended to be seen by a user, is directed towards the outside of the package. Screen 30 is essentially formed of a transmissive diffuser, that is, a sheet, plate, or film transmitting to its front surface the light illuminating its rear surface, by more or less strongly diffusing this light. The output cone of the diffuser is for example centered on the propagation direction of the light illuminating its rear surface, that is, when the diffuser receives, on its rear surface side, a light beam under a normal incidence, the intensity of the beam emitted by the diffuser on its front surface side is maximum along an axis normal to the screen, and decreases as the propagation angle of the diffused light deviates from the direction normal to the screen. However, as a variation, the diffuser may be such that the main diffusion axis forms a non-zero angle with the propagation direction of the light illuminating its rear surface. As an example, the diffuser of screen 30 is a transmissive holographic diffuser capable of transmitting rays which reach it on the inside of package 20 to the outside of package 20 with a controlled diffusion of these rays. As a variation the diffuser of screen 30 may be a non-holographic diffuser, for example, a diffuser comprising a structured Fresnel-type mirror having a surface with a characteristic particle size much smaller than the diameter of the illumination beam.

Two planar reflective mirrors 32 and 34 respectively positioned along wall 28 and wall 26 are provided inside of the package. A mobile light source 36 is substantially positioned at the angle between walls 24 and 29. Laser source 36 is positioned to illuminate mirror 34, so that the beam reflected by mirror 34 reaches mirror 32, and that the beam reflected by mirror 32 reaches transmissive diffuser 30. Mobile source 36 is for example a picoprojector of the type called LBS in the art (for "Light Beam Steering") comprising a laser source and a mirror mobile along one or two axes formed in MEMS technology. As shown in FIG. 2, source 36 is assembled to be able to rotate along at least two axes so as to be able to sweep the entire surface of diffuser 30, via successive reflections on mirrors 34 and 32.

The positioning of mirror 32 relative to transmissive diffuser 30, according to an acute angle, enables to provide a projection with no deformation (a square gives a square). To limit the bulk, mirror 32 is preferably placed relatively opposite the transmissive diffuser.

Figure 3:
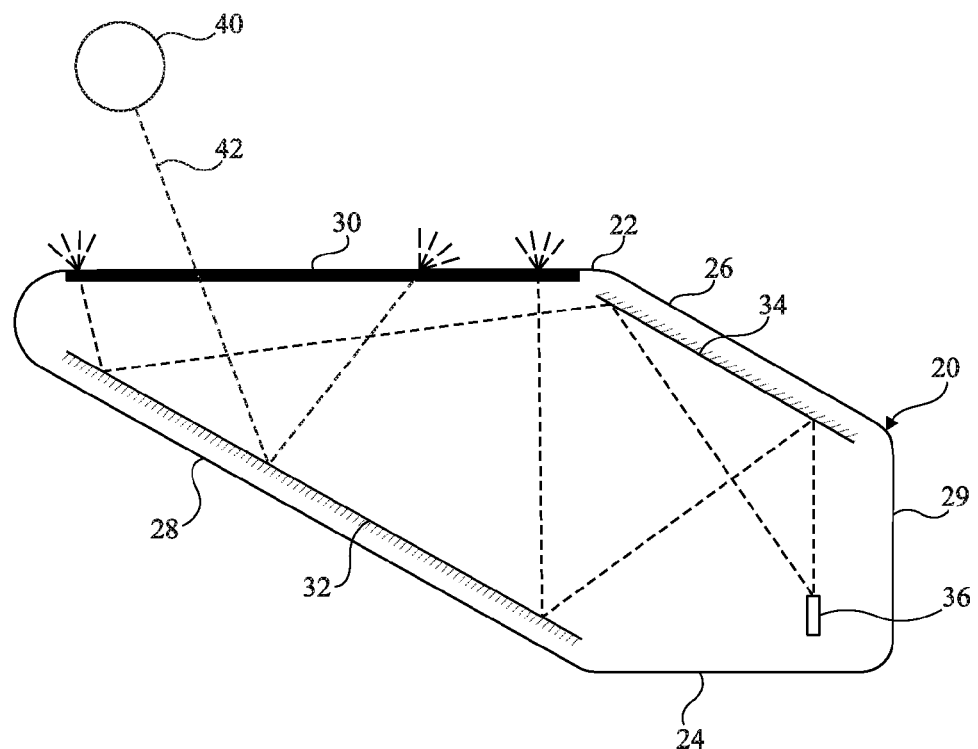
FIG. 3 illustrates a disadvantage of the overhead projection display device of FIG. 2.

FIG. 3 illustrates a disadvantage of the device of FIG. 2.

FIG. 3 shows the structure of package 30 and all the elements forming this package and which are formed in package 30. A parasitic light source 40, for example, sunlight, is placed in this example opposite transmissive diffuser 30.

Parasitic light source 40 emits a ray 42 which crosses transmissive diffuser 30, reaches mirror 32, which reflects it towards transmissive diffuser 30. Indeed, a transmissive diffuser transmits light both ways by diffusing it. Thus, parasitic light source 40 creates a parasitic beam at the output of diffuser 30, towards an observer. In the case where parasitic source 40 implies an intense ambient light, a parasitic diffusion over the entire displayed image may be generated by this phenomenon.

It should be noted that the shape of package 20, as well as the number and the arrangement of the mirrors contained in the package, are only described as an example herein, since only the association of source or picoprojector 36, of transmissive diffuser 30, and of the elements taking the beam originating from light source 36 to diffuser 30 here matters. More generally, the idea is to take the beam emitted by source 36 all the way to the rear surface of diffuser 30, by more or less folding this beam by means of one or a plurality of mirrors, for example arranged on surfaces of the package, according to the bulk constraints. To achieve this, other arrangements than those shown in the drawings may be provided.

Thus, there is a need for a device providing a overhead projection and limiting the above parasitic effects.

Figure 4:
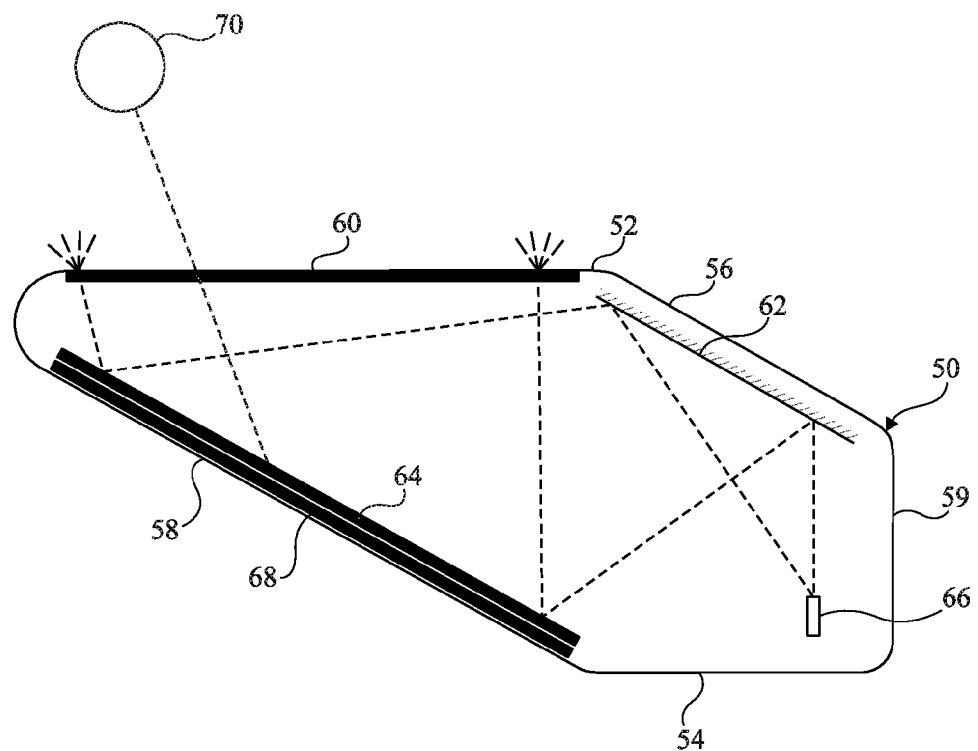
FIG. 4 illustrates a overhead projection display device according to an embodiment.

FIG. 4 illustrates a overhead projection display device according to an embodiment.

This drawing illustrates a package 50 similar to package 20 described in relation with FIG. 2. Package 50 is formed of an assembly of walls: a wall 52 parallel to a wall 54, a wall 56 parallel to a wall 58, and a wall 59 perpendicular to walls 52 and 54. Wall 52 is longer than wall 54 and wall 58 is longer than wall 56. Wall 58 forms with wall 52 an acute angle and wall 56 forms with wall 54 an obtuse angle. Wall 59, perpendicular to wall 54, is in contact with walls 56 and 54 to close package 50. As previously indicated, this arrangement is an example of embodiment only. It will be within the abilities of those skilled in the art to provide other arrangements providing the desired effect.

An opening having a transmissive diffuser 60 positioned therein is defined in wall 52. Along wall 56 is provided a planar mirror 62 and, in the angle between walls 54 and 59, a light source 66 is provided.

Source 66 preferably is a laser source, for example, formed of an LBS-type picoprojector, mobile along at least two axes. Other light sources, preferably laser sources, may however be provided. As an example, a non-LBS picoprojector, having laser diodes rather than conventional LEDs as sources, may be used. As a variation, a non-laser source having a narrow spectrum, for example, a LED having a spectrum with a width in the order of 30 nm or at least at mid-height may be appropriate. Thus, source 66 is provided to be mobile so as to sweep at least a portion of the surface of mirror 62. Conventionally, source 66 is a colored light source at the output of which the beam may contain three wavelengths, one wavelength corresponding to green, one wavelength corresponding to blue, and one wavelength corresponding to red.

Along wall 58, to replace mirror 32 of FIGS. 2 and 3, a holographic mirror 64 is provided. On the rear surface of holographic mirror 64, a black absorbent screen 68 is positioned. The positioning of holographic mirror 64 and of mirror 62 is provided so that the beams originating from light source 66 and reflecting on the surface of mirror 62 are reflected by holographic mirror 64 to sweep the entire surface of transmissive diffuser 60.

To avoid the above-described problems of parasitic reflection, a holographic mirror 64 parameterized so that it only reflects wavelengths corresponding to red, green, and blue originating from source 66 is provided. Holographic mirror 64 thus reflects three very specific wavelengths, and transmits the other wavelengths. More generally, holographic mirror 64 is parameterized to only reflect the wavelength(s) of source 66 (source 66 may also be monochrome).

Thus, if a parasitic beam originating from a light source 70 placed outside of package 50 penetrates into package 50 via transmissive diffuser 60 and reaches the assembly formed of holographic mirror 64 and of black screen 68, holographic mirror 64 transmits all the wavelengths apart from the wavelength(s) of source 66 toward black screen 68 and only reflects the wavelength(s) of source 66. Thus, all wavelengths, except for the wavelengths of source 66, are absorbed by black screen 68.

In the present example, only the three wavelengths of light source 66 are reflected by holographic mirror 64. It should be noted that such a parasitic reflection, even if it reaches diffuser 60 after reflection on holographic mirror 64, is relatively little disturbing since only a small part of the incident parasitic light intensity is reflected in this manner.

Thus, holographic mirror 64 only reflects the preselected wavelength(s) of the laser originating from source 66. To obtain such a holographic mirror, a film, which comprises a number of Bragg mirrors across its volume, the mirrors being provided to specifically reflect the wavelength(s) originating from light source 66, may in particular be used. It may also be provided to use, to obtain holographic mirror 64, a thin film comprising properly parameterized Fabry Pérot-type cavities.

Advantageously, the use of a stack of a holographic mirror 64 reflecting the wavelengths originating from source 66 provides a parasitic diffusion corresponding to approximately 2% of the parasitic diffusion in the case where the device only comprises a conventional mirror. It should be noted that laser source 66 may be formed of a single source providing three different wavelengths or of three independent laser sources, each providing one desired wavelength. In the other way, the beam originating from laser source 66 reflected on mirror 62 and then on device 64/68 has, at the device output, a potential luminance loss as compared with the device of FIG. 2 smaller than 5%. However, the obtained contrast may be strongly increased.

As an example of numerical application for the device of FIG. 4, a diffuser 60 horizontally positioned in the drawing, having a wavelength in the order of 138 mm, may be provided. The assembly formed of holographic mirror 64 and of black screen 68 may have a length, in the plane of the drawing, in the order of 134 mm. Planar mirror 62 may have a dimensions in the order of 52 mm and laser source 66 may be positioned vertically in line with mirror 62 at a 67-mm distance therefrom. Mirror 62 is positioned relative to laser source 66 so that the laser source sweeps mirror 62 with an incidence varying between 28° and 55°.

Similarly, the beam reflected by mirror 62 towards assembly 64/68 reaches holographic mirror 64 with an angle varying between 28° and 55°. As an example, the angle formed between mirror 62 and the horizontal direction, as well as the angle formed between elements 64/68 and the horizontal direction, may be in the order of 29°. The distance separating the planes containing walls 52 and 54 may be in the order of 101 mm. It should be noted that all these dimensions are here provided as an example only and relatively to one another, with a 10% tolerance. Thus, the devices may be provided to be larger or smaller while respecting the dimension ratios provided herein. It should be noted that the dimensions mentioned hereabove as an example have been defined from the laser deviation performances. Further, as indicated hereabove, the embodiments are not limited to the example of arrangement of the various elements shown in the drawings.

Specific embodiments have been described. Various alterations and modifications will occur to those skilled in the art. In particular, it should be noted that the shape of package 50 may be different from the shape provided herein, according to the desired applications. The idea suggested herein is to associate a source of a laser beam with one or a plurality of predefined wavelengths for a transmissive diffuser 60, a holographic mirror only reflecting the wavelengths of the laser beam having its rear surface covered with a black screen 68 provided on the path of the laser beam.

Thus, mirror 62 may be optional if a package structure different from that provided herein is used. It should however be noted that the positioning of assembly 64/68 relative to transmissive diffuser 60, according to an acute angle, enables to provide a projection with no deformation (a square gives a square). Such a positioning in a compact package may imply carrying out a plurality of reflections of the laser beam before reaching transmissive diffuser 60.

Further, laser source 66 may be replaced with any light source capable of providing a beam according to at least one wavelength, holographic mirror 64 being provided to reflect the wavelength(s) of the light source only, and to transmit the other wavelengths.

The invention claimed is:

1. A rear-projection display device comprising:
   a mobile light source supplying a light beam of at least one wavelength, a holographic mirror reflecting only said at least one wavelength, an absorbent screen, and a transmissive diffuser, the absorbent screen being placed on the rear surface of the holographic mirror, the elements being arranged so that the beam from the light source is reflected on the holographic mirror to scan the surface of the transmissive diffuser and
   a package having the mobile light source, the holographic mirror, and the absorbent screen integrated therein, an opening being defined in the package, the transmissive diffuser being placed at the level of said opening.

2. The rear-projection display device of claim 1, wherein the light source is a laser source.

3. The rear-projection display device of claim 1, further comprising a planar mirror on the path of the light beam between the source and the holographic mirror.

4. The rear-projection display device of claim 1, wherein the light source supplies a light beam at a first red wavelength, a second blue wavelength, and a third green wavelength.

5. The rear-projection display device of claim 1, wherein the light source is assembled to be mobile along two axes.

6. The rear-projection display device of claim 1, wherein the holographic mirror is formed of a film comprising, across its bulk, Bragg mirrors.

7. The rear-projection display device of claim 1, wherein the holographic mirror is formed of a film comprising, across its bulk, Fabry Perot-type cavities.

8. The rear-projection display device of claim 1, wherein the absorbent screen is a black screen.

9. The rear-projection display device of claim 1, wherein the transmissive diffuser has a curved surface.

10. The rear-projection display device of claim 1, wherein the transmissive diffuser is a holographic diffuser.

11. A vehicle comprising a central console having the rear-projection display device of claim 1 integrated therein.

* * * * *